(12) United States Patent
Amrhein

(10) Patent No.: US 6,465,923 B2
(45) Date of Patent: *Oct. 15, 2002

(54) MAGNETICALLY JOURNALLED ELECTRICAL DRIVE

(75) Inventor: Wolfgang Amrhein, Ottensheim (AU)

(73) Assignee: Sulzer Electronics AG (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,221
(22) PCT Filed: Jun. 19, 1998
(86) PCT No.: PCT/CH98/00268
§ 371 (c)(1), (2), (4) Date: Dec. 16, 1999
(87) PCT Pub. No.: WO98/59407
PCT Pub. Date: Dec. 30, 1998

(65) Prior Publication Data
US 2002/0093263 A1 Jul. 18, 2002

(30) Foreign Application Priority Data
Jun. 21, 1997 (DE) .......................... 197 26 352

(51) Int. Cl.[7] ............................... H02K 7/09
(52) U.S. Cl. .................. 310/90.5; 310/179; 310/184
(58) Field of Search ..................... 310/90.5, 179, 310/180, 182, 184, 185

(56) References Cited

U.S. PATENT DOCUMENTS 3,572,854 A * 3/1971 Danby .................. 308/10
5,036,235 A 7/1991 Kleckner

FOREIGN PATENT DOCUMENTS

| EP | 0726638 A2 | 8/1996 |
|---|---|---|
| EP | 0768750 A1 | 4/1997 |
| WO | WO 97/15978 | 5/1997 |

OTHER PUBLICATIONS

Yohji Okada et al.: "Levitation and Torque Control of Internal Permanent Magnet Type Bearingless Motor" *IEEE Transactions on Control Systems Technology* 4(5) 565–571 (Sep. 5, 1996).

A. Chiba et al.: "An Analysis of Bearingless AC Motors" *IEEE Transactions on Energy Conversion* 9(1) 61–68 (Mar. 1, 1994).

* cited by examiner

Primary Examiner—Nestor Ramirez
Assistant Examiner—Thanh Lam
(74) Attorney, Agent, or Firm—Townsend and Townsend and Crew LLP

(57) ABSTRACT

A magnetically journalled electrical drive has a magnetically journalled electrical machine with machine and magnetic bearing windings which are inserted in the stator or rotor for the production of torque and the suspension force, and an analog or digital electronic circuitry for the control, regulation, monitoring and excitation of the magnetically journalled machine. The magnetically journalled machine is equipped in the stator or rotor with separate single or multiple looped windings for producing the torque (30, 31, 32, 33) and for producing the suspension force (34, 35, 36, 37), with at least one of the windings being formed as a concentrated winding with pronounced winding poles.

17 Claims, 15 Drawing Sheets

MAGNETICALLY JOURNALLED ELECTRICAL DRIVE

BACKGROUND OF THE INVENTION

The invention relates to a magnetically journalled electrical drive.

Magnetic journalling technology opens up fields of application of machine and apparatus construction with extremely high requirements on the speed of rotation region, the lifetime, the purity and the sealing tightness of the drive system—thus substantially fields of application which cannot or can only with difficulty be realised using conventional journalling techniques. Various embodiments, such as for example high speed milling and grinding spindles, turbocompressors, vacuum pumps, or pumps for chemical or medical products of high purity, are already being equipped with magnetic bearings.

In the art, loops are alternatively known as phases. Thus the term loop, single loop or multiple loop can alternatively mean phase, single phase or multiple phase.

A conventional magnetically journalled electrical machine (FIG. 1) requires, in addition to a machine unit 1, two radial magnetic bearings 2 and 3 respectively, an axial magnetic bearing 4, two mechanical interception bearings 5 and 6 respectively, and a total of thirteen power controllers 7, 8, 9 and 10 for the excitation of the motoric and magnetic bearing loops.

There are proposals (FIG. 2) in the literature for integrating machines and radial magnetic bearings in a magnetic stator unit. Two separate winding systems 11 and 12 for the torque and suspension force winding are inserted multiply layered into grooves in a stator. Both winding systems are three-looped and differ by one in the number of pole pairs. The coils are distributed over a plurality of grooves. The example of FIG. 2 shows:

- a four-pole machine winding 11 (outside): first loop 13, second loop 14, third loop 15
- a two-pole suspension winding 12 (inside): first loop 16, second loop 17, third loop 18.

The arrows (without reference symbols) from the rotor in the direction towards the stator or from the stator in the direction towards the rotor stand for the direction of the magnetization of the four magnetic rotor segments (e.g. radial or diametral magnetization).

In applications which require no rigid-axis rotor guidance, such as for example in ventilators, fans, pumps or mixers, the axial magnetic bearing and the second radial magnetic bearing can be omitted from the integrated machine-magnetic-bearing embodiment. A prerequisite for this is a disc-shaped embodiment of the rotor with a length dimension (FIG. 3) which is small with respect to the rotor diameter. Thus a passive stabilization of the rotor position in the axial direction and the tilt directions can be achieved via the magnetic traction 41 between the stator 39 and the rotor 40.

In many cases, however the complicated and expensive system construction and therewith the higher manufacturing costs stand in the way of the technical use of magnetic journalling.

SUMMARY OF THE INVENTION

It is therefore an object of the invention simplify the mechanical construction of the machine and magnetic bearing unit, taking into consideration the electronic excitation which is suitable for this.

Preferred embodiments of the invention embodiment are characterised by a considerably simplified stator or rotor construction respectively, the winding construction of the magnetically journalled machine with respect to previously known solutions, as well as the saving of power controllers. Thus, for example, only three loops and six coils are required for a magnetically journalled single phase motor.

Exemplary embodiments of the invention are explained in the following with reference to the drawings.

DESCRIPTION OF THE PREFERRED EMBODIMENTS

Figure 1:
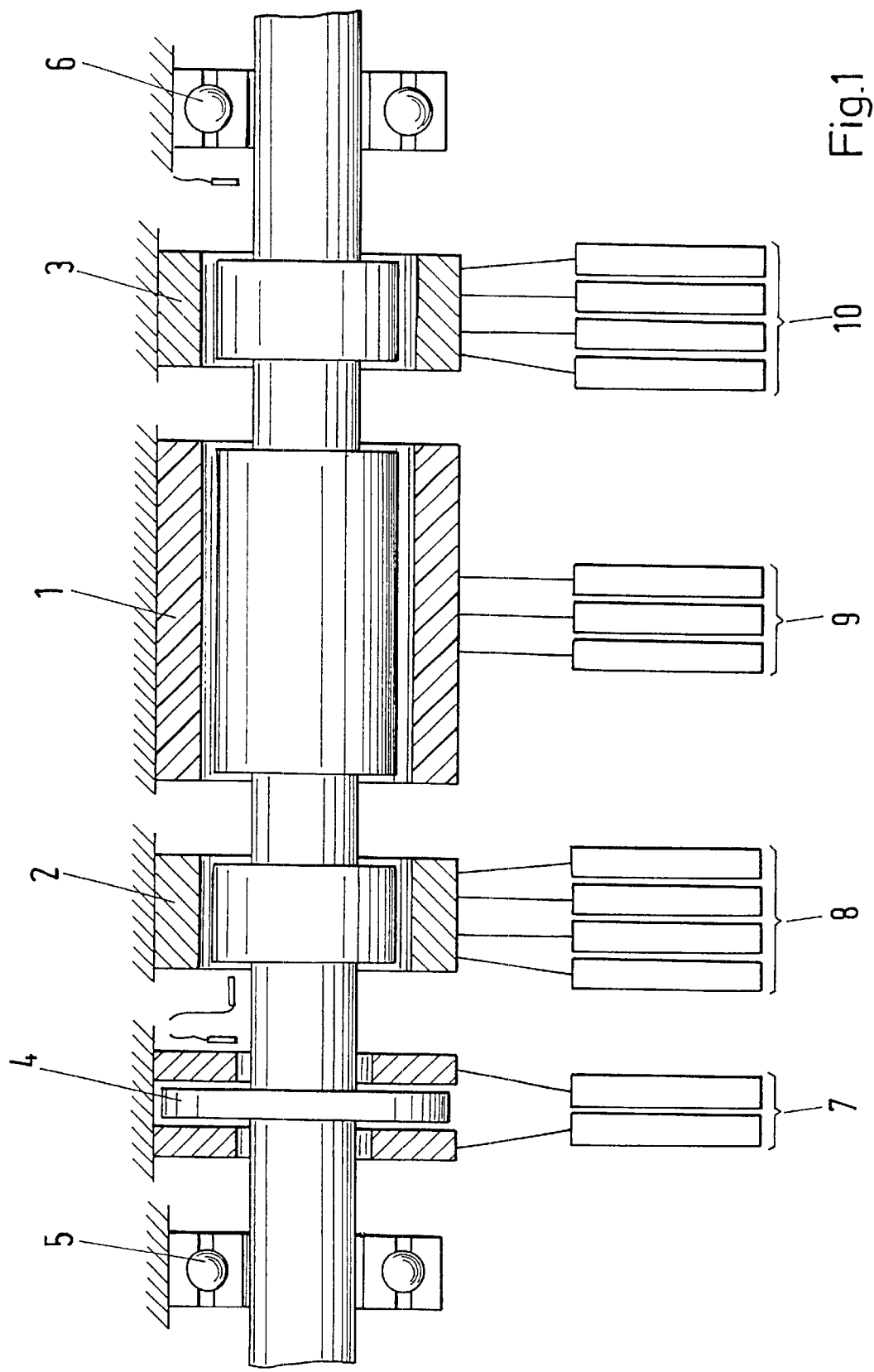
FIG. 1 is an exemplary embodiment of a conventional magnetically journalled electrical machine.
Figure 2:
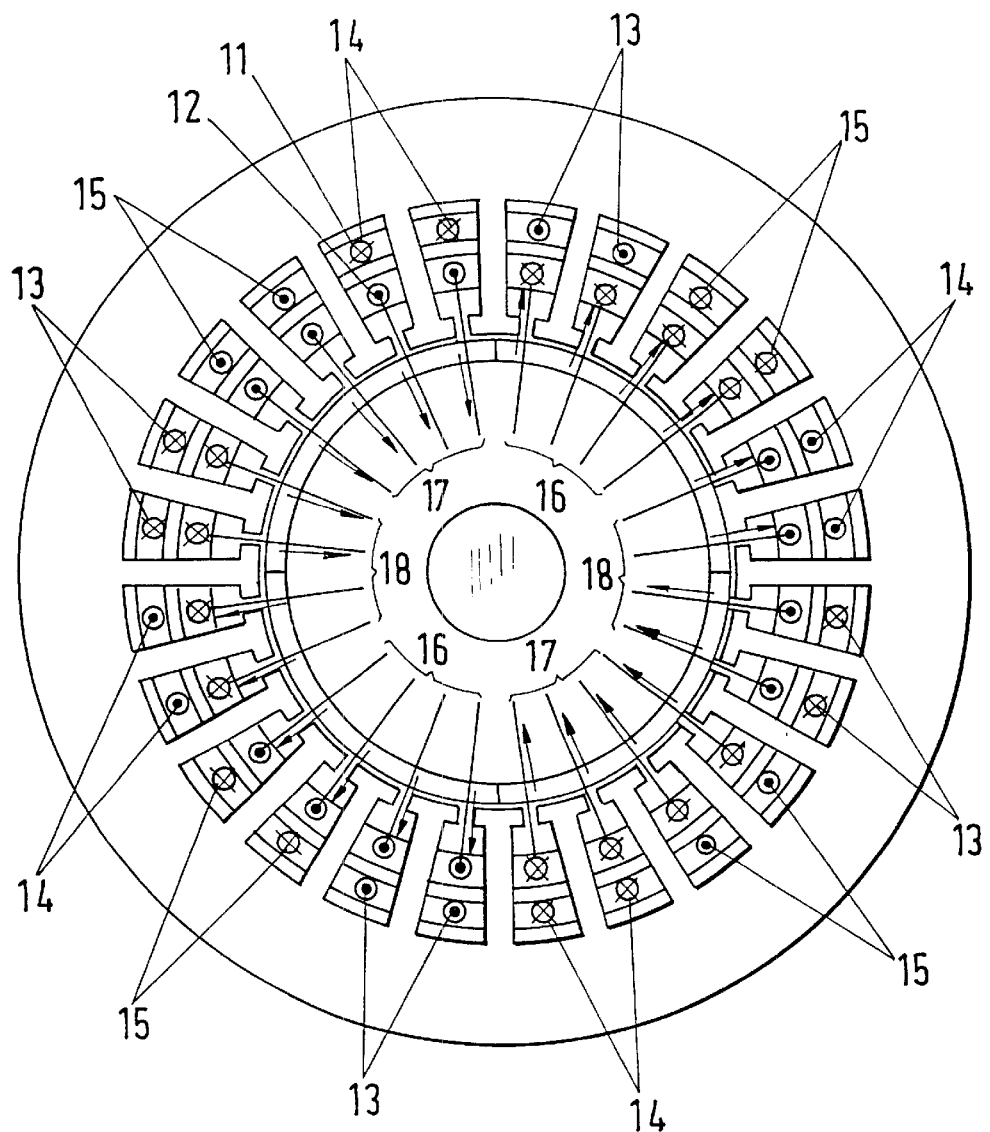
FIG. 2 is an exemplary embodiment of a conventional magnetically journalled electrical machine in which the machine and the radial magnetic bearing are integrated into a magnetic stator unit.
Figure 3:
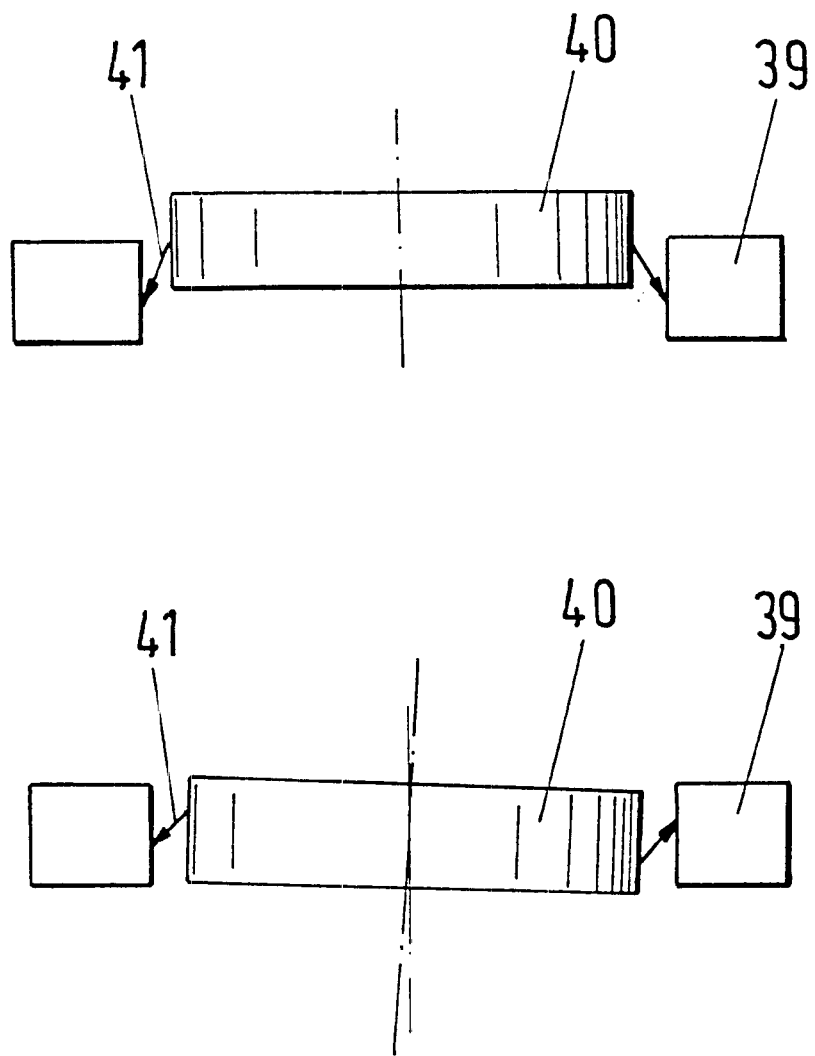
FIG. 3 shows the possibility of passive stabilization of the rotor in the axial direction as well as in the tilt directions.
Figure 4:
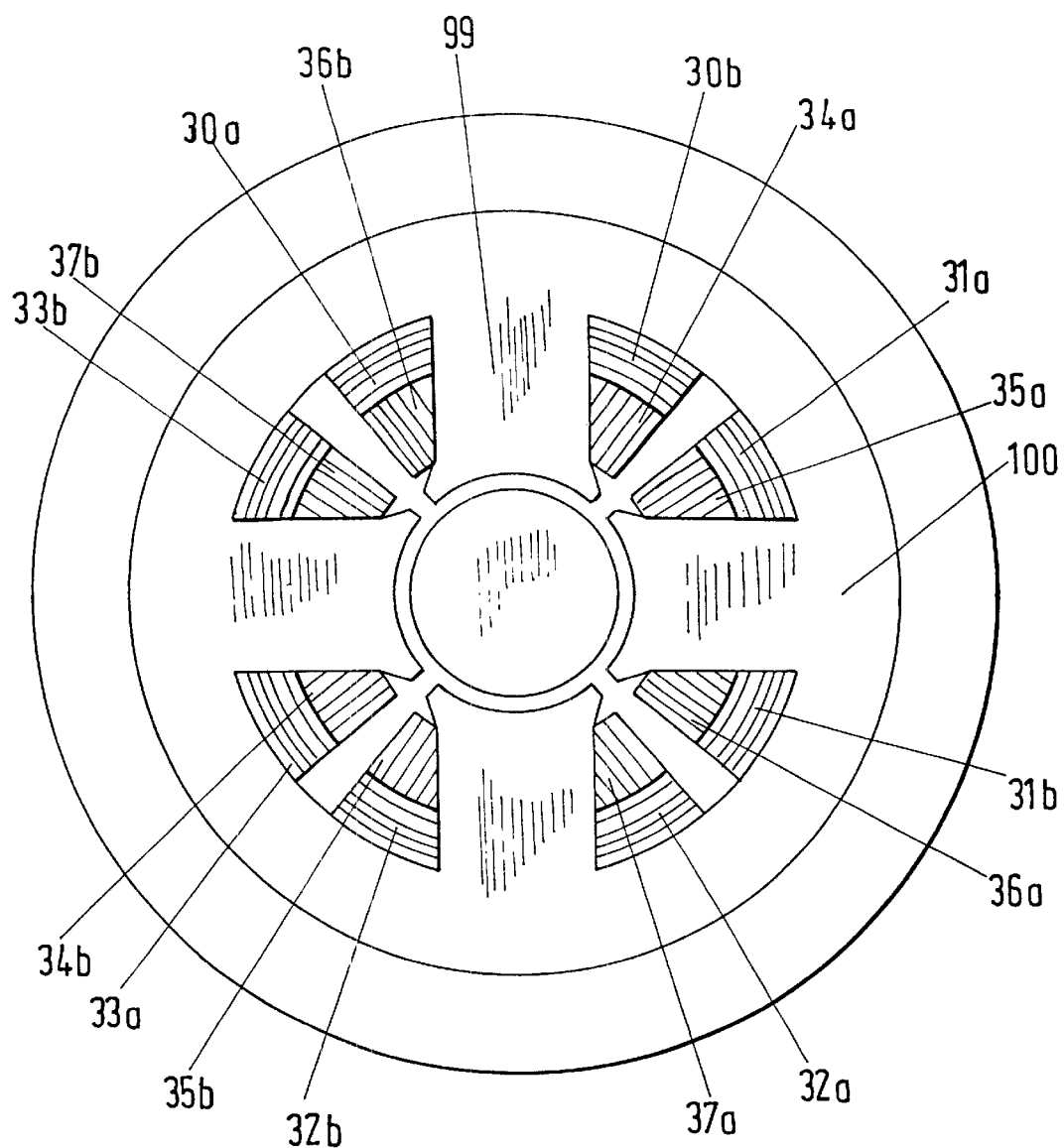
FIG. 4 is an exemplary embodiment of a stator of the magnetically journalled electrical drive in accordance with the invention.
Figure 8:
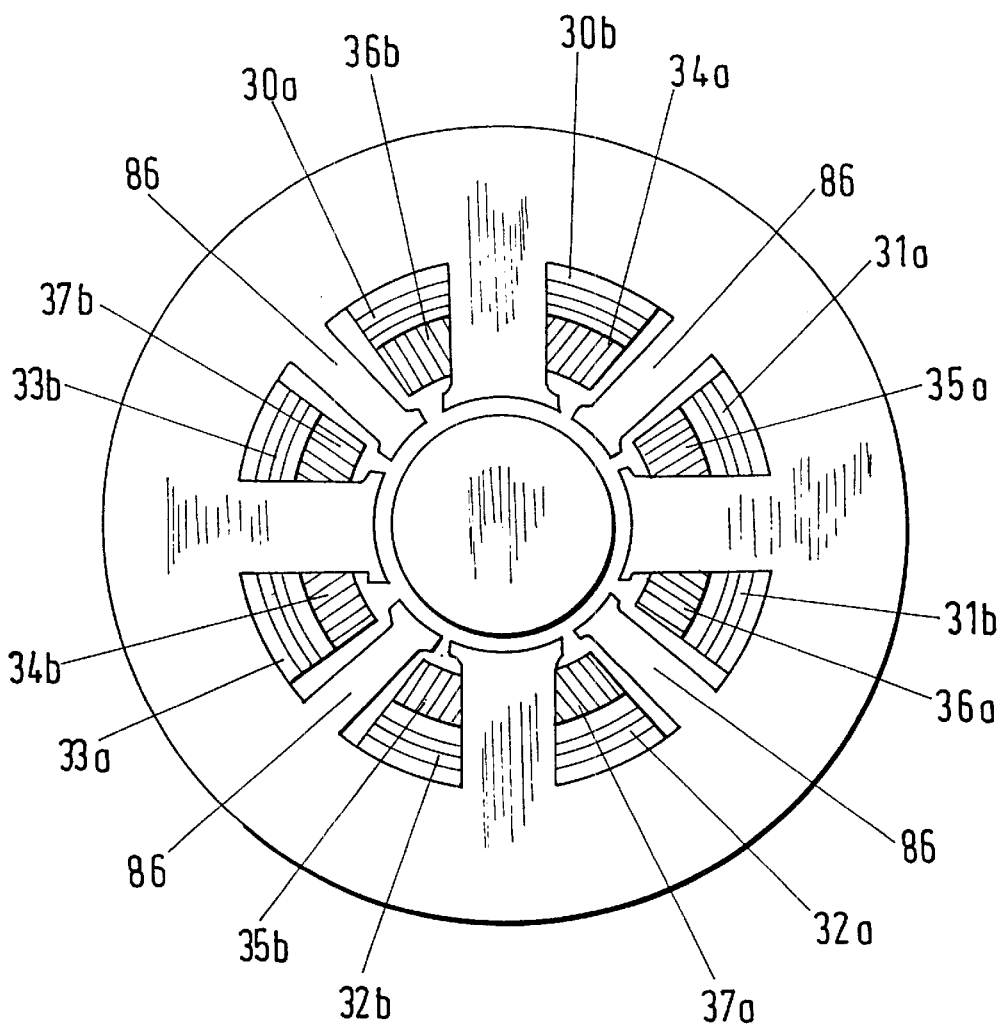
FIG. 8 is an exemplary embodiment of the magnetically journalled drive in accordance with the invention with sinewed concentric windings and with pronounced poles and auxiliary poles.

The machines can be operated as a motor or as a generator depending on the application. FIG. 4 shows an embodiment of a machine-magnetic-bearing unit (the stator is e.g. fitted in an aluminum ring or aluminum cylinder respectively for a better cooling) with concentrated diameter windings and pronounced poles. Concentrated windings are to be understood here to mean windings of which the coils are not distributed over a pole division and at the same time (magnetically effectively) displaced with respect to one another. Thus the coils 34 and 35 respectively are considered to be concentrated. By pronounced poles are meant ferromagnetic poles or air coil poles which are surrounded by a concentrated winding. In this category are included for example limb poles 99, which are surrounded by the concentrated winding, or singly or multiply divided poles such as 99 and 100, which are magnetically enclosed by the concentrated coil 36. The windings can also be fractionally pitched, i.e. executed with a winding width smaller or larger than a pole division. An exemplary embodiment for this is illustrated in FIG. 8. In a strong fractional pitching it is under certain conditions favorable to close the pole gap which arises through the shortening of the pole width with a ferromagnetic auxiliary pole 86. The functions of the production of torque and suspension force are realized in the arrangements in FIG. 4 and FIG. 8 by two winding systems: a single-loop, four-pole machine winding and a two-loop magnetic bearing winding.

The machine loop is formed of the coils 30, 31, 32 and 33, the first magnetic bearing loop is formed of the coils 34 and 35 and the second magnetic bearing loop of the coils 36 and 37. The concentrated coils of the machine loop form pronounced poles (here: limb poles) with the ferromagnetic material. Depending on the requirements they can be connected to one another in series or in parallel and upon excitation with an alternating current develop a four-pole rotary field which suffices in order for example to produce a torque at a four-pole permanent magnet rotor. The first and the second magnetic bearing loop are arranged at an angle of 90° to one another. A two-pole rotary field is built up via a corresponding current excitation of the magnetic bearing loops for the setting of the radial suspension force in amplitude and phase. The coils of a machine or magnetic bearing loop in FIG. 4 are connected in series or in parallel. The magnetic bearing coils 34 and 35 and/or the coils 36 and 37 can when required in each case be combined to a single coil and form concentrated windings.

Figure 5:
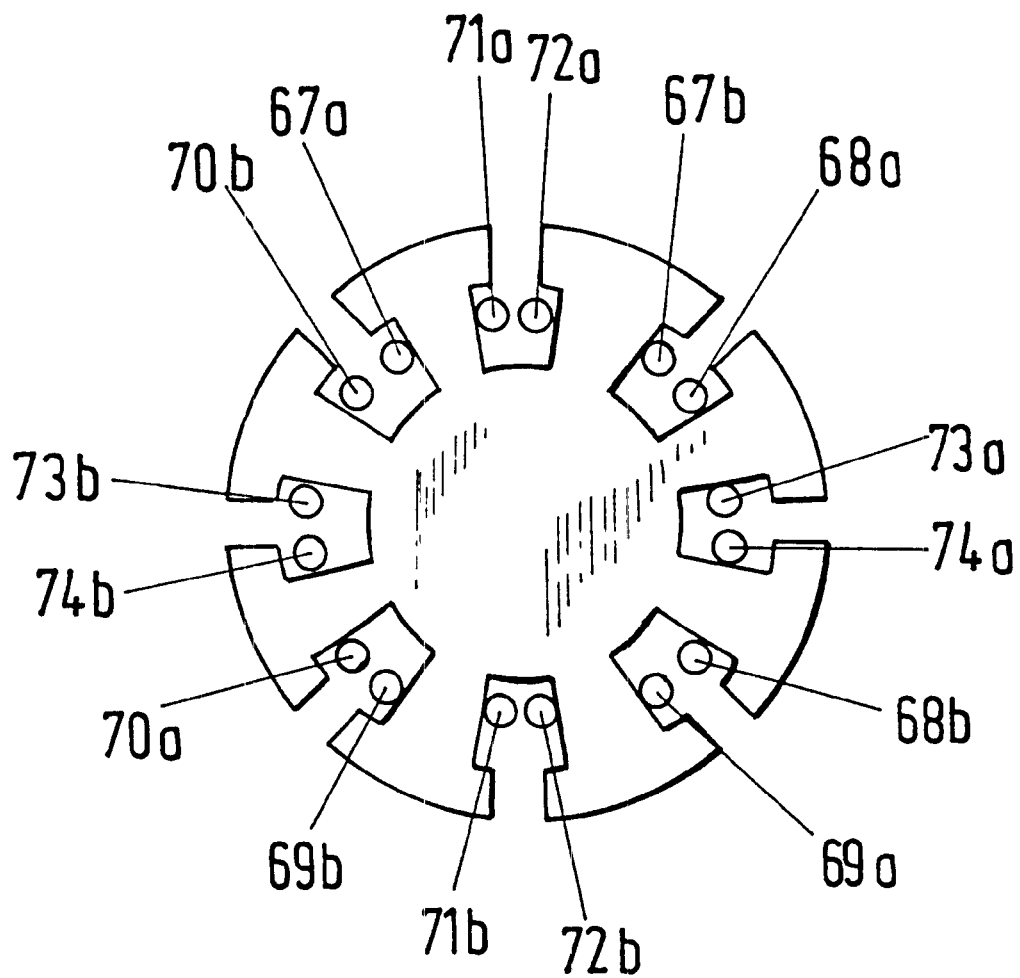
FIG. 5 is an exemplary embodiment of the electrical drive in accordance with the invention with a technical winding variant for an outer rotors.

FIG. 5 illustrates a technical winding variant for an outer rotor drive with likewise a single-loop, four-pole machine winding 67, 68, 69, 70 and a two-loop, two-pole magnetic bearing winding with the first loop 71, 72 and the second loop 73, 74, which is arranged perpendicular to the latter. The two loops of the magnetic bearing winding can also be rotated by 45° and laid in grooves of the machine winding so that a construction similar to that in FIG. 4 results. Furthermore, the coils 71, 72 and 73, 74 can in each case be combined to form one coil. As concerns the machine loop, two mutually oppositely lying coils, e.g. 68, 70, could be dispensed with. The outer rotor of the arrangement in FIG. 5 is preferably executed as a four-pole ring or as a bell.

Figure 6:
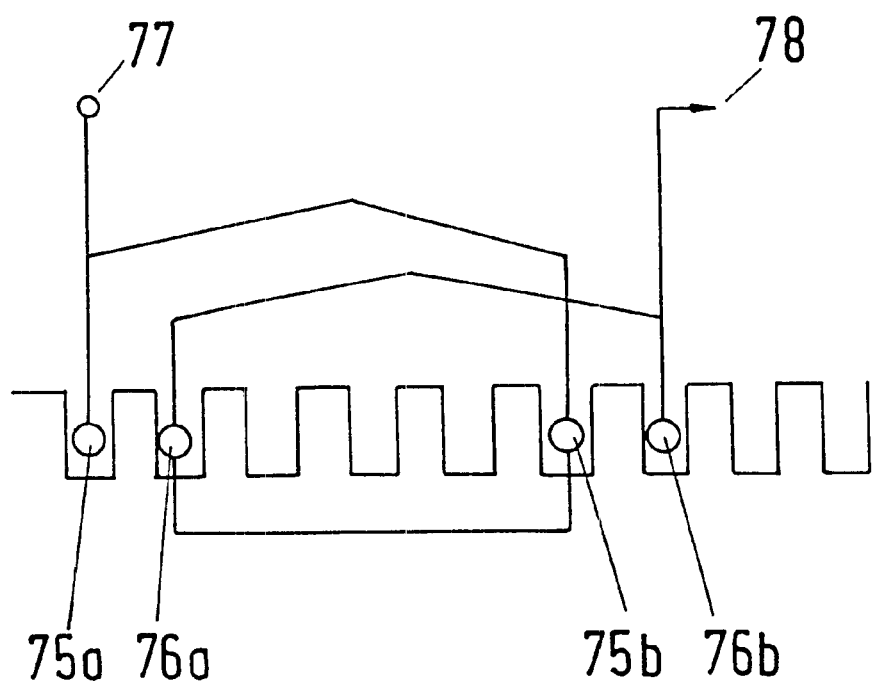
FIG. 6 is an exemplary embodiment of an electrical drive with a plurality of distributed coils.

Alternatively to the arrangement in FIG. 4 and FIG. 5 the machine winding or the magnetic bearing winding can also be built up of a plurality of (illustrated as two) distributed coils 75, 76 (FIG. 6). Accordingly, one recognizes in FIG. 6 a first loop connection 77 and a second loop connection 78 or, respectively, the further connection to the next adjacent winding pole with the opposite winding sense.

Figure 7:
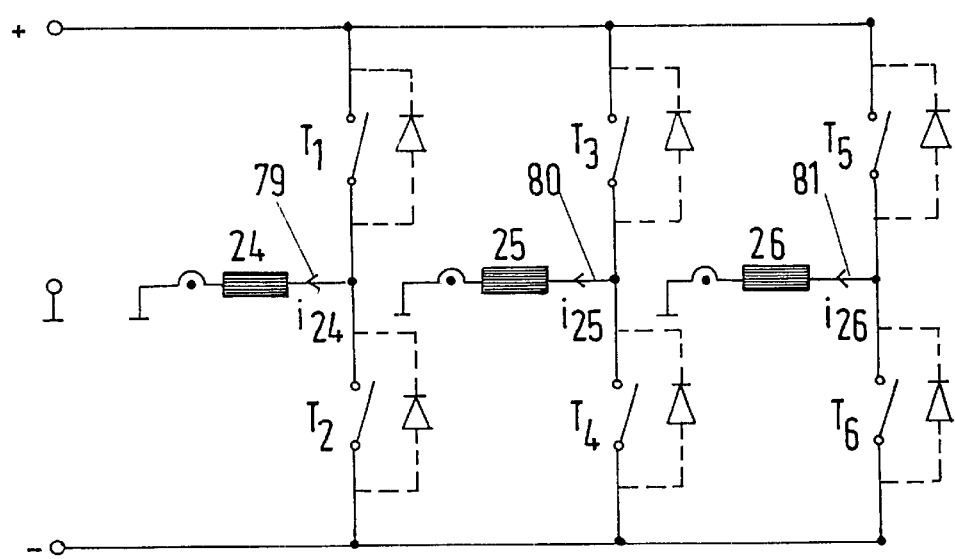
FIG. 7 is an exemplary embodiment of a possible bridge circuit for the excitation of the electrical drive.

The determination of the individual loop currents is done by taking into account the specified desired values and the actual values for example of the rotor position and speed of rotation, the rotor angle of rotation or torque after the evaluation of the sensor signals for the rotor position, and rotor angle of rotation by means of an analog circuit or of a high speed computer unit. The signals which are determined are amplified by a power electronic circuitry and supplied to the three loops via clocked switches or analog power amplifiers. A possible bridge circuit is given in FIG. 7. The machine loop is designated by 24, the two magnetic bearing loops by 25 and 26. Instead of the impression of a current an impression of the voltage can also take place taking into account the characteristic of the regulation path.

The rotor type of the machine can be chosen freely, in particular when the machine operation takes place via a rotary field instead of an alternating field. Usable are for example permanent magnet rotors, short-circuit cage rotors, rotors with an electrically highly conducting metal jacketing instead of the short-circuit cage or reluctance rotors with angle-dependent air gap variations.

Figure 9:
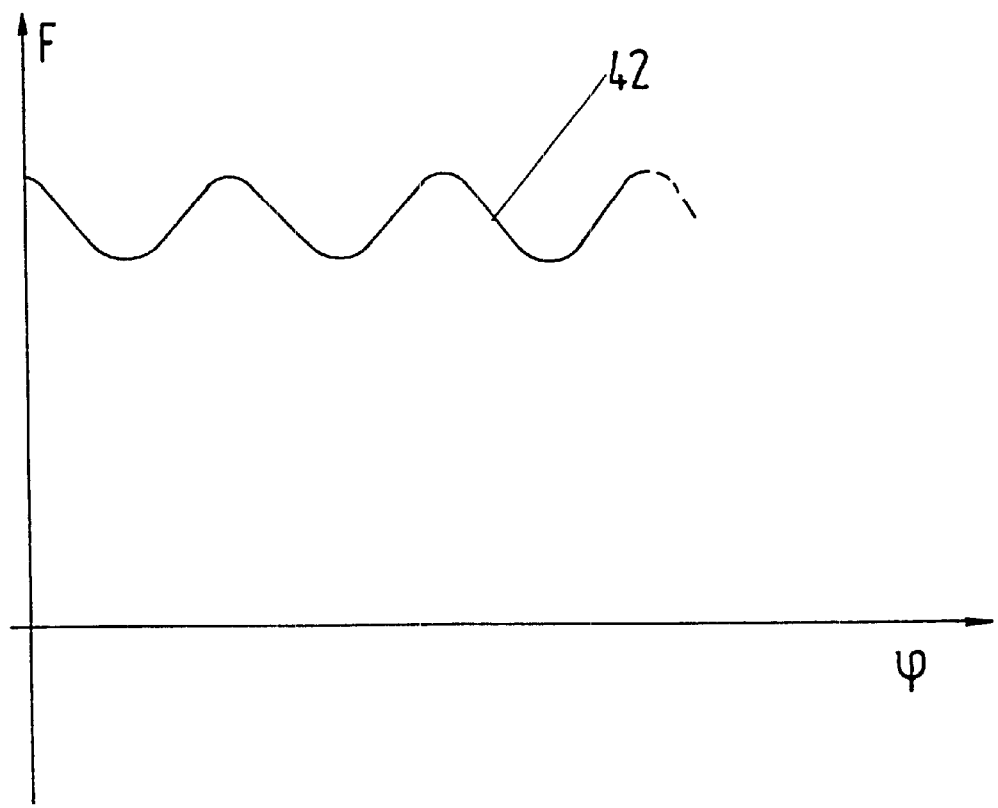
FIG. 9 is an illustration of the angle-dependent force fluctuations in non-sinusoidal stator current layer distributions and non-sinusoidal excitation field distribution in the air gap.

In the event of insufficient fractional pitch or distribution respectively of the windings and in the event of non-sinusoidal excitation field distributions, angle dependent radial force fluctuations 42, such as are illustrated for example in FIG. 9, arise through the harmonic content of the air gap fields in the current excitation of a loop of the radial bearing winding in accordance with FIG. 4, FIG. 5 or FIG. 8 with a constant current amplitude when the rotor is rotated. This effect should be taken into account in the current excitation of the windings in order to achieve a good operating behavior.

Figure 14:
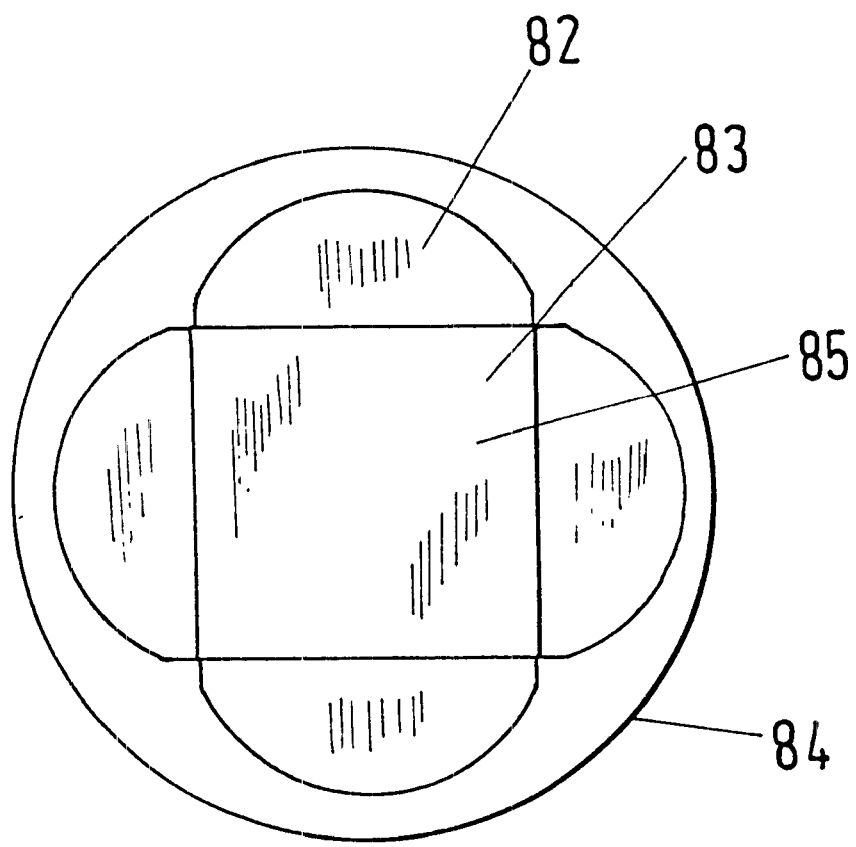
FIG. 14 is an exemplary embodiment of a drive in accordance with the invention with a special shaping of the magnet segments for achieving a sinusoidal excitation field distribution in the air gap.

A sufficiently sinusoidal excitation field distribution can be achieved in the use of permanent magnet rotors 85 for example through a shaping 82 with an angularly dependent air gap between the rotor and the stator 84 in accordance with FIG. 14. A diametral magnetization of the permanent magnets also acts favorably with respect to a sinusoidal field distribution. The ferromagnetic rear contact or yoke of the rotor is designated by 83. For reasons of cost it can however be advantageous to use concentrated windings and radially or diametrally magnetized magnets without a special shaping.

Figure 10:
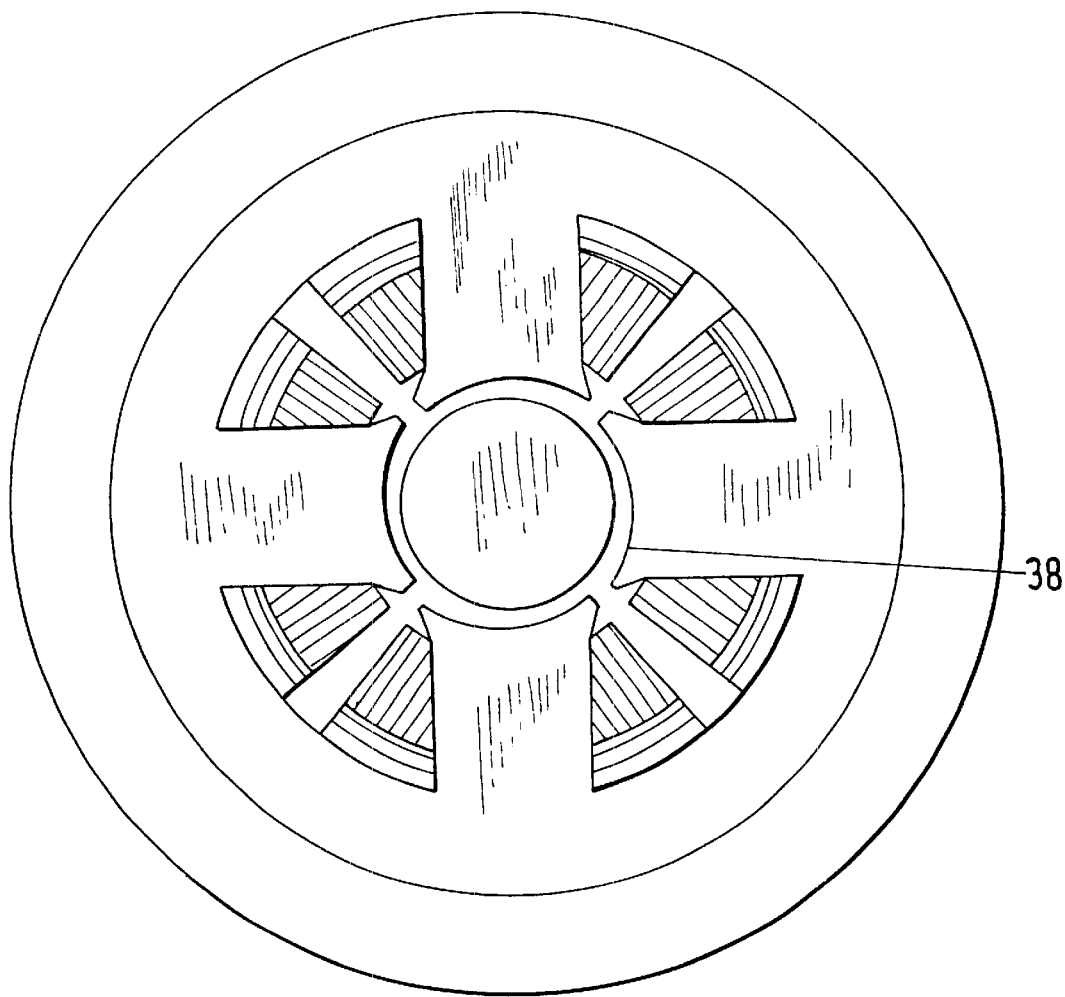
FIG. 10 is an exemplary embodiment of the drive in accordance with the invention with an asymmetric sheet metal cut in the region of the winding poles.
Figure 11:
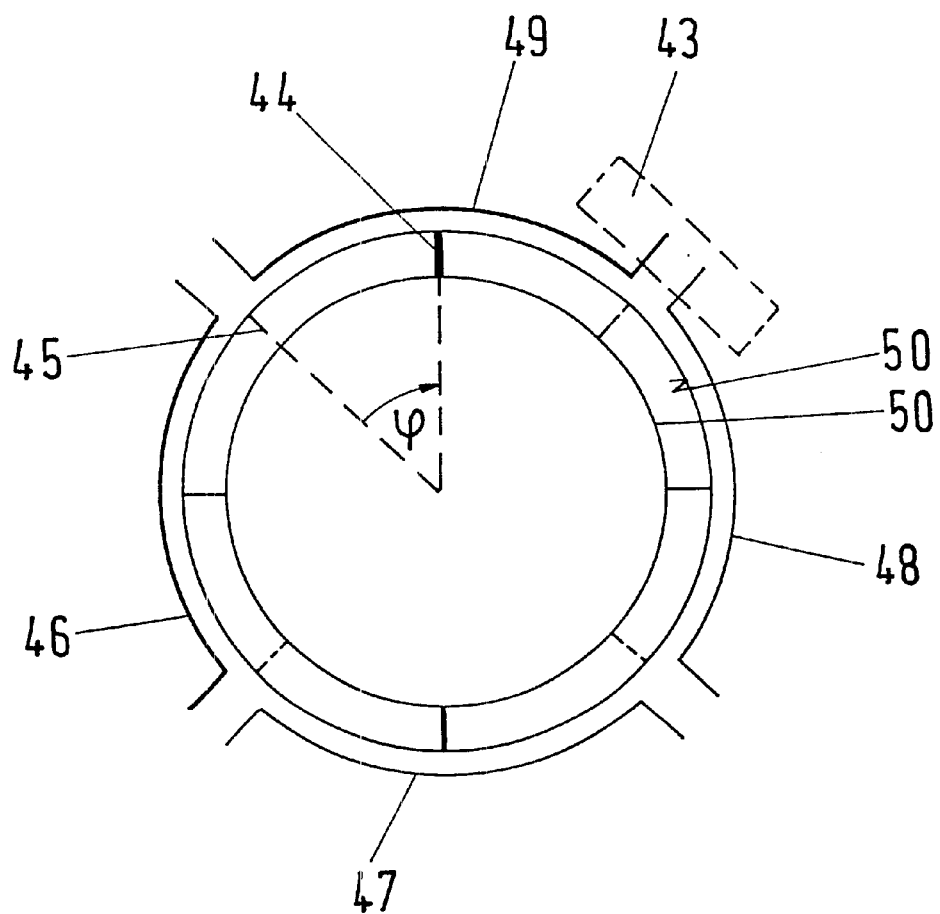
FIG. 11 is an exemplary embodiment of a drive in accordance with the invention with an auxiliary magnet for ensuring the start-up in a motor operation with an alternating field.

Since only an alternating field is available for the machine operation in the magnetically journalled machine in FIG. 4 or FIG. 5 respectively, an auxiliary torque is to be provided where appropriate at the time point of the start-up for overcoming the dead zone. This can for example be done through an asymmetrical sheet metal cut 38 in the region of the winding poles (FIG. 10). A further proposed solution (FIG. 11) provides one or more auxiliary magnets 43 which are arranged axially or radially with respect to the rotor, and which for example bring the four-pole permanent magnet rotor 50 into a favorable starting position 44 with the angle $\phi$ as a result of their drawing force. In the position 45 of the magnet pole boundary the starting torque would be zero with an arbitrarily high current. The winding poles are indicated by 46, 47, 48 and 49. In order to assist the drawing force the auxiliary magnets can additionally be provided with an iron yoke.

Figure 12:
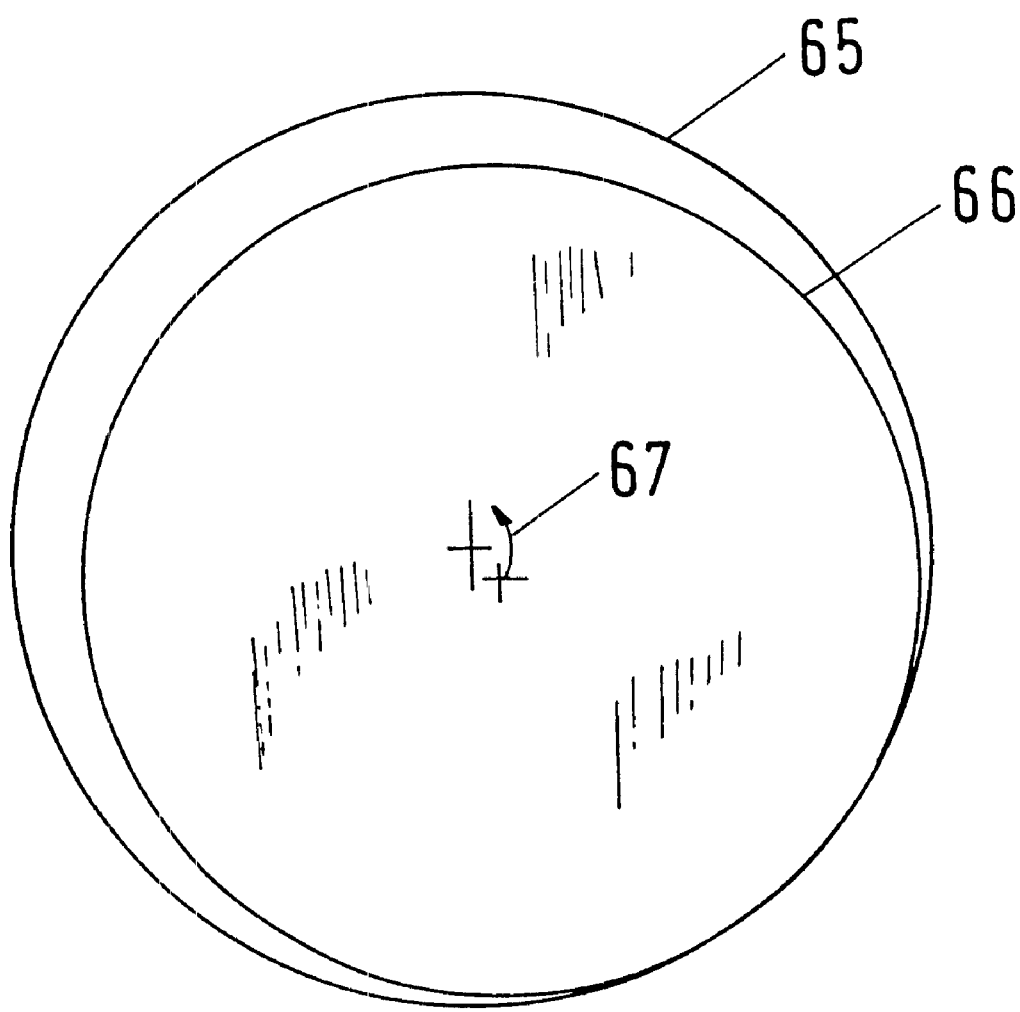
FIG. 12 shows a possibility of the controlled rolling down of the rotor at the stator poles.

A change in the magnet pole position could also be produced through a rolling down (FIG. 12) of the rotor 66 at the end side of the air gap of the stator pole 65 which is controlled by the magnetic bearing part. As a result of the different diameters there results in the rolling down a growing angular displacement between the magnet and stator poles so that the rotor can be rotated out of the dead zone in which a torque development is not possible. The midpoint movement of the rotor during the rolling down is represented by 67. It may be necessary to provide means at the periphery of the rotor and/or stator for preventing a sliding between the rotor and the stator during the rolling down movement (e.g. use of materials with high frictional values, roughening of the surfaces, toothing, etc.)

Figure 13:
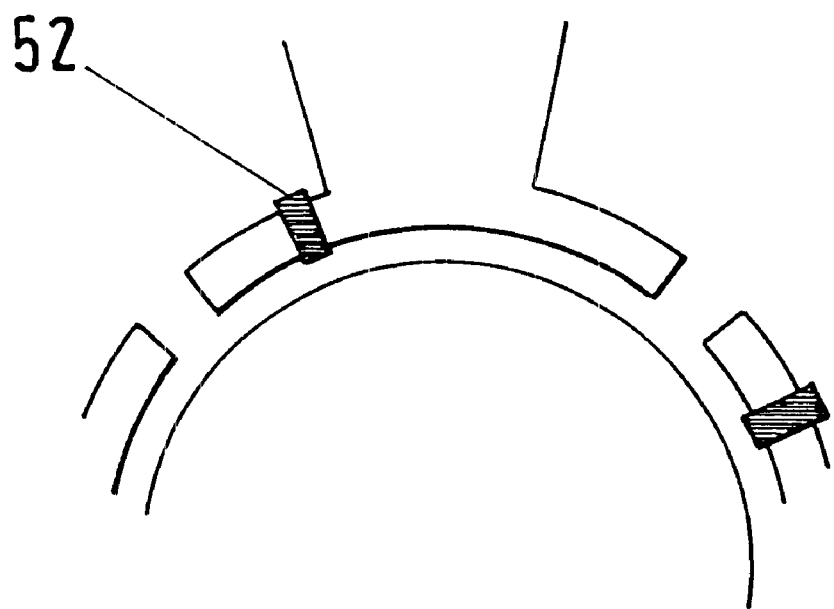
FIG. 13 is an exemplary embodiment of a drive in accordance with the invention with short-circuit rings which are attached one-sidedly at the stator poles.

A further proposed solution is illustrated in FIG. 13. The stator poles are provided on one side with a short-circuit ring 52 so that as a result of the short-circuit currents a highly elliptical rotary field develops in the air gap instead of the alternating field.

FIGS. 4, 5, 8 and 10 are to be considered as exemplary both with respect to the number of pole pairs for the torque and suspension force production and with respect to the loop number of the two windings. Modified numbers of pole pairs can also be realized, with it being necessary for the condition $p_M = p_{ML} \pm 1$ to be fulfilled between the number of pole pairs $p_M$ for the machine operation and the number of pole pairs $p_{ML}$ for the magnetic bearing operation. Through enlargement of the loop number and the number of bridge branches in the electronic power circuitry a rotary field machine can also be integrated in accordance with the invention into the magnetically journalled drive instead of an alternating field machine.

Figure 15:
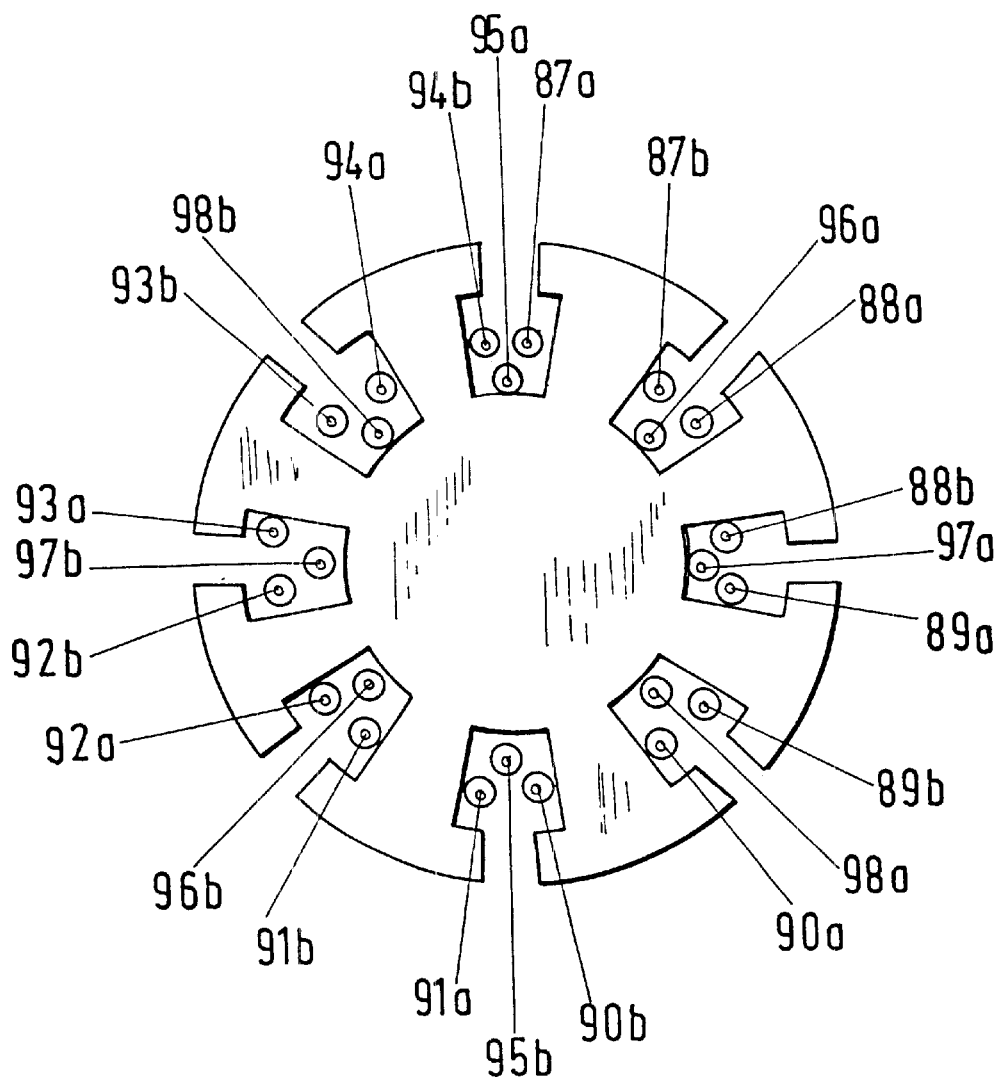
FIG. 15 is an exemplary embodiment of a stator of the magnetically journalled drive in accordance with the invention with the possibility of a rotary field production both in the machine and in the radial bearing.

A possible exemplary embodiment for this is illustrated in FIG. 15. The stator contains two four-pole machine loops consisting of the coils 87, 89, 91, 93 and 88, 90, 92, 94, which are connected in series or in parallel. The machine loops are displaced electrically with respect to one another by 90° so that an armature rotary field for the production of a torque can be built up with a four-pole rotor without torque gap. This arrangement therefore requires no start-up help in contrast to preceding examples.

The diameter coils 95 and 97 form the two loops of the radial magnetic bearing, which are displaced by 90°. Here a rotary field production is also possible. For the better utilization of the available winding space two further coils 96 and 98 can be introduced and for example the coil 96 can be connected to the coil 95 and the coil 98 can be connected to the coil 97 to form a single loop in each case.

Another constructional variant, likewise with the numbers of pole pairs two and one in the stator windings could also be realized with a two-pole rotor. For this the single or multiple looped machine winding would be chosen to be two-poled and the multiple looped magnetic bearing winding to be four-poled.

A further essential aspect of the invention, which is completely independent of the previously explained aspects, is based finally on the recognition that it is possible to equip the magnetically journalled machine of the electrical drive in accordance with the invention in the stator or rotor with separate windings for the torque and suspension force production and in this to form the machine winding in a single loop.

What is claimed is:

1. A magnetically journalled electrical drive comprising a magnetically journalled electrical machine, machine and magnetic bearing windings inserted in at least one of a stator and a rotor for producing torque and a suspension force, and electronic circuitry for control, regulation, monitoring and excitation of the magnetically journalled machine, wherein the magnetically journalled machine is equipped in at least one of the stator and the rotor with a separate one of a single looped winding and a multiple looped winding for producing the torque and the suspension force, at least one of the windings being formed as a concentrated winding with pronounced winding poles, and wherein the one of a single looped winding and a multiple looped winding for producing the torque has a number of pole pairs $p_M$ and the one of a single looped winding and a multiple looped winding for producing the suspension force has a number of pole pairs $p_{ML} = p_M \pm 1$.

2. An electrical drive in accordance with claim 1 wherein the magnetic bearing winding for producing the suspension force is formed in a number of loops for developing a rotary field.

3. An electrical drive in accordance with claim 1 wherein the concentrated winding is formed as a diameter winding.

4. An electrical drive in accordance with claim 1 wherein the magnetic bearing winding is formed in two loops and the motor winding is formed in one loop; and in that the numbers of pole pairs of the magnetic bearing winding and of the motor winding amount to one and two without evaluation of the sequence.

5. An electrical drive in accordance with claim 1 wherein the at least one of the rotor and the stator of the electrical drive is equipped with permanent magnets, a short-circuit cage, and one of an electrically highly conducting metal jacketing and a reluctance cut.

6. An electrical drive in accordance with claim 1 wherein all windings are formed as concentrated windings.

7. An electrical drive in accordance with claim 1 wherein a favorable start-up position of the rotor is set via a corresponding excitation of the magnetic bearing windings by rolling down of the rotor on a surface of the stator which faces the rotor.

8. An electrical drive in accordance with claim 1 wherein the machine winding for producing the torque is formed with one of a number of loops for the production of a rotary field and a single loop for the production of an alternating field.

9. An electrical drive in accordance with claim 1 wherein the concentrated winding is fractionally pitched and is thereby provided with a coil width which is one of less than and greater than a pole division.

10. An electrical drive in accordance with claim 1 wherein the case of a single looped machine winding a start-up aid for the reliable start-up is provided in the form of an asymmetrical stator sheet metal cut and, at least one auxiliary magnet and at least one short-circuit ring.

11. An electrical drive in accordance with claim 1 wherein the magnetically effective part of the at least one of the rotor and the stator has one of a disc, ring and bell shape with small axial dimensions relative to radial dimensions so that a stable passive magnetic journalling of the rotor in the axial direction and two tilt directions arises as a result of the force action by magnetic air gap fields.

12. A magnetically journalled electrical drive comprising a magnetically journalled electrical machine, machine and magnetic bearing windings inserted in at least one of a stator and a rotor for producing torque and a suspension force, and electronic circuitry for control, regulation, monitoring and excitation of the magnetically journalled machine, wherein the magnetically journalled machine is equipped in the at least one of the stator and the rotor with separate one of a single looped winding and multiple looped windings for producing the torque and the suspension force, at least one of the windings being formed as a concentrated winding with pronounced winding poles, and wherein the machine winding for producing the torque is formed with one of a number of loops with the number of pole pairs $p_M = p_{ML} \pm 1$ for the production of a rotary field and a single loop for the production of an alternating field.

13. A magnetically journalled electrical drive comprising a magnetically journalled electrical machine, machine and magnetic bearing windings inserted in at least one of a stator and a rotor for producing torque and a suspension force, and electronic circuitry for control, regulation, monitoring and excitation of the magnetically journalled machine, wherein the magnetically journalled machine is equipped in the at least one of the stator and the rotor with separate one of a single looped winding and multiple looped windings for producing the torque and the suspension force, at least one of the windings being formed as a concentrated winding with pronounced winding poles, and wherein the concentrated winding is fractionally pitched and is thereby provided with a coil width which is one of less than and greater than a pole division.

14. A magnetically journalled electrical drive comprising a magnetically journalled electrical machine, machine and magnetic bearing windings inserted in at least one of a stator and a rotor for producing torque and a suspension force, and electronic circuitry for control, regulation, monitoring and excitation of the magnetically journalled machine, wherein the magnetically journalled machine is equipped in the at least one of the stator and the rotor with separate one of a single looped winding and multiple looped windings for producing the torque and the suspension force, at least one of the windings being formed as a concentrated winding with pronounced winding poles, and wherein the case of a single looped machine winding a start-up aid for the reliable start-up is provided in the form of an asymmetrical stator sheet metal cut and, at least one auxiliary magnet and at least one short-circuit ring.

15. A magnetically journalled electrical drive comprising a magnetically journalled electrical machine, machine and magnetic bearing windings inserted in at least one of a stator and a rotor for producing torque and a suspension force, and electronic circuitry for control, regulation, monitoring and excitation of the magnetically journalled machine, wherein the magnetically journalled machine is equipped in the at least one of the stator and the rotor with separate one of a single looped winding and multiple looped windings for producing the torque and the suspension force, at least one of the windings being formed as a concentrated winding with pronounced winding poles, and wherein the magnetically effective part of the at least one of the rotor and the stator has one of a disc, ring and bell shape with small axial dimensions relative to radial dimensions so that a stable passive magnetic journalling of the rotor in the axial direction and two tilt directions arises as a result of the force action by magnetic air gap fields.

16. A magnetically journalled electrical drive comprising a magnetically journalled electrical machine and electronic circuitry for control, regulation, monitoring and excitation of the magnetically journalled machine, said machine comprising a rotor provided with one of permanent magnetic excitation, a short circuit cage and an electrically highly conducting metal jacketing, and machine and magnetic bearing windings inserted in a stator for producing torque and a suspension force, wherein the magnetically journalled machine is equipped in the stator with one of a single looped winding and a multiple looped winding with the number of pole pairs $p_M$ for producing the torque and with a separate one of a single looped winding and a multiple looped winding with the number of pole pairs $p_{ML}=p_M\pm1$ for producing the suspension force, at least one of the windings being formed as a concentrated winding with pronounced winding poles.

17. An electrical drive in accordance with claim 16 wherein the rotor of the electrical drive is equipped with a short-circuit cage, and one of an electrically highly conducting metal jacketing and a reluctance cut.

* * * * *

UNITED STATES PATENT AND TRADEMARK OFFICE
CERTIFICATE OF CORRECTION

PATENT NO. : 6,465,923 B2
DATED : October 15, 2002
INVENTOR(S) : Amrhein

It is certified that error appears in the above-identified patent and that said Letters Patent is hereby corrected as shown below:

<u>Title page,</u>
Item [73], Assignee, please delete "Sulzer Electronics AG" and insert therefor -- Lust Antriebstechnik GmbH --.

Signed and Sealed this

Twenty-ninth Day of April, 2003

JAMES E. ROGAN
*Director of the United States Patent and Trademark Office*